Aug. 29, 1961    H. BIEBER ET AL    2,998,382
REGENERATION OF SPENT CAUSTIC BY FOAMING
Filed Oct. 1, 1958
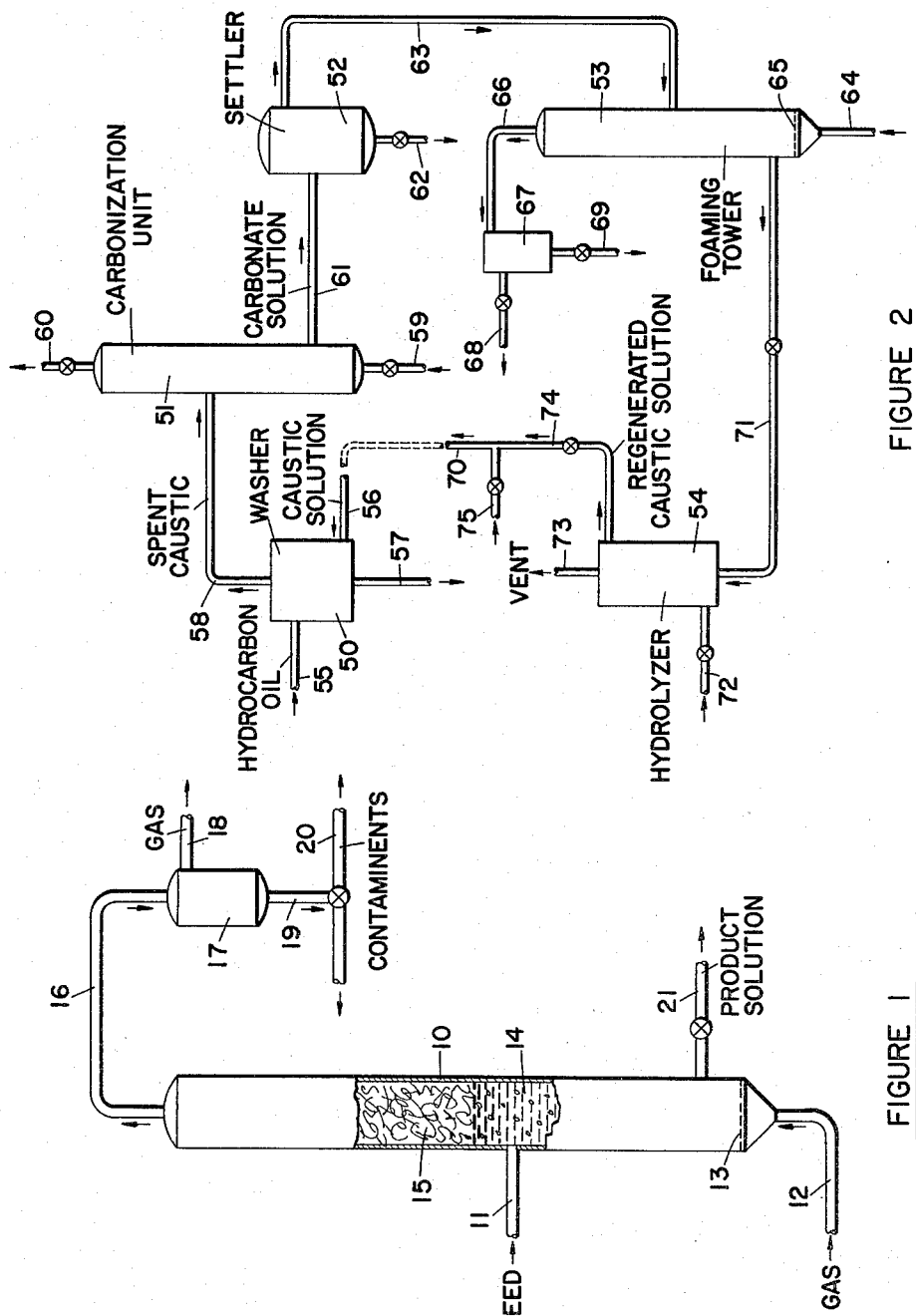
Herman Bieber
Ibrahim A. Eldib         INVENTORS
Malcolm A. Weiss
BY Robert S. Pearlman AGENT

2,998,382
REGENERATION OF SPENT CAUSTIC BY FOAMING

Herman Bieber, Linden, Ibrahim A. Eldib, Roselle, and Malcolm A. Weiss, Union, N.J., assignors to Esso Research and Engineering Company, a corporation of Delaware
Filed Oct. 1, 1958, Ser. No. 764,645
12 Claims. (Cl. 208—235)

The present invention is concerned with the regeneration of caustic solutions which have been used to treat hydrocarbon oils. More particularly, it deals with the removal of organic contaminants from spent caustic by the application of foam fractionation.

It is well known in the art of petroleum refining to contact various hydrocarbon streams, such as crude oil, distillates, etc., with caustic solutions. Caustic washes have been used to neutralize the hydrolyzed products of metals found in crude oil, as well as to aid in the sweetening of oil fractions by the removal of oxygenated acidic materials. By way of example, a caustic solution in combination with phenols has been used to extract mercaptans from oil stocks.

In all these applications of caustic washes for improving the quality of hydrocarbon streams, the caustic solution ultimately becomes contaminated with impurities, principally of an organic nature. The resulting spent caustic solution will thus contain impurities such as acid oils, e.g. cyclohexane and methylcyclohexane carboxylic acids, derivatives of phenol, e.g. ortho, para and meta cresols, para tertiary amyl phenol, and mercaptides as well as other contaminants. Due to the very large quantities of caustic employed for treating hydrocarbons, it is normally economically necessary to regenerate the caustic, i.e. remove organic impurities, the caustic thereafter being re-used. Towards this end, regeneration procedures employing steam to hydrolyze mercaptides or oxygen (normally in the presence of a catalyst) to form insoluble disulfides have been devised. In addition, it has been suggested to convert the spent caustic into a carbonate solution in which the impurities are predominantly non-soluble, and thereafter reform caustic from the decanted carbonate solution.

While the above processes are roughly effective in regenerating spent caustic, it has been found difficult to fully remove the organic impurities. The prior art processes are particularly inept in treating caustic solutions containing trace amounts of impurities. In accordance with the present invention, an improved means for regenerating spent caustic solution is set forth, the improved method being characterized by its particular effectiveness in removing small concentrations of organic contaminants. It may be used in place of, or in conjunction with, the prior art regenerative procedures, advantageously being employed as a final clean-up step.

More particularly, in accordance with the present invention, spent caustic solution is subjected to foaming so as to form distinct froth and liquid portions. It has been found that the organic impurities found in the caustic are surface active. These surface active constituents concentrate at the gas-liquid interface in the foam. Thus, by establishing a large phase interface, i.e. foaming, a separation may be secured between the surface active organic impurities which concentrate in the foam and the remainder of the solution. The latter is thus freed of impurities, recovered, and recycled for further use in hydrocarbon treatments.

Generally, this separation by foaming, i.e. foam fractionation, is effected by passing finely dispersed gas upwardly through the spent caustic solution. Organic impurities amass in the interface surrounding the fine gas bubbles and pass upwardly into the foam layer normally formed above the bulk liquid.

The foam producing gas may be any of a number of readily available gases, such as carbon dioxide, air, nitrogen, hydrocarbons, ammonia, steam, etc. In one embodiment of the present invention, the gas is chosen so as to react with a portion of the contaminants, principally sulfur compounds, the converted contaminants along with unconverted surface active components being taken off in the form of foam. Subjecting the impurities to reaction during foaming is advantageous in that decreased reaction times (i.e. smaller reactors) can be used. The rate of such a reaction is generally determined by the gas-side mass transfer coefficient, so that the benefits of increasing interfacial area become apparent.

In a preferred embodiment of the present invention, the present separation-by-foaming procedure is employed in conjunction with the carbonization method previously described for caustic regeneration. In this embodiment, after converting the caustic to a carbonate solution (by contacting it with carbon dioxide) in order to cause phenol derivatives, acid oils, etc. to drop out of solution due to their decreased solubility in carbonate solution, the carbonate liquid which still contains a small portion of soluble organic impurities is subjected to foaming. Foam fractionation is particularly effective in this case since the variation of surface tension with concentration is greatest in the range of small quantities of impurities, the degree of variation of this relationship being a prime physical index of the degree of concentration of surface active components in the gas-liquid interface in the foam. Thus, an unusual situation is encountered whereby the prior separation of impurities tends to enhance, rather than detract from, the degree of fractionation obtained in a subsequent separation step.

By way of clarifying nomenclature, the terms "caustic solution" or "alkaline solution" as used in the present specification denote solutions of the alkali metals, particularly those of sodium and potassium. The terms include solutions of hydroxides, carbonates and other salts resulting in liquids of basic, as opposed to acidic, properties.

The various aspects of the present invention will be made more clearly apparent by reference to the following description, drawings and accompanying examples.

FIGURE 1 depicts a system for foaming spent caustic by dispersion of gas into the caustic solution.

FIGURE 2 illustrates a particularly desirable combination process wherein foam fractionation is employed in conjunction with carbonization and hydrolysis.

Turning to FIGURE 1, there is shown a system for treating the spent caustic resulting from the sweetening of a, for example, catalytic heating distillate oil fraction (450–700° F. ASTM), by the addition of a 7.6% solution of sodium hydroxide. The actual sweetening step can be any well known procedure for washing hydrocarbons with a caustic solution. During the course of the caustic wash, phenols and acid oils such as cyclohexane carboxylic acid dissolve in the caustic solution. A portion of the caustic solution is withdrawn from the hydrocarbon washing step and, according to the present invention, subjected to the present regenerative procedure.

As fed to foaming tower 10 by line 11, the spent caustic contains about 2.36 wt. percent acids oils, and 9.6 wt. percent phenol derivatives (measured as an average of different compounds).

Tower 10 is a relatively simple, elongated chamber. Positioned in its bottom portion are means for dispersing gas into solution 14 as extremely fine bubbles. A perforated dish or sintered plate 13 is shown for this purpose although numerous other structures, such as multiple fine gas jets, can alternatively be employed. Any of a number of gasiform materials may be utilized for effecting foaming of the caustic. In the present example, air at ambient temperature is introduced into tower 10 by line 12 and distributor 13, the air being dispersed throughout the liquid in the form of fine bubbles ranging from about 10 to 1000 microns in diameter.

As the bubbles of air rise upwardly through liquid mass 14, the organic impurities in the spent caustic concentrate at the gas-liquid interface created by the gas bubbles. The air bubbles, carrying along acid and phenol impurities, continue their passage and form a distinct froth or foam phase 15 above liquid 14. Although at least some of the gas bubbles will tend to break, thus giving a type of internal refluxing, it is desired to have a relatively stable foam layer. In the event that the spent caustic, by itself, does not give a stable foam, a foam stability agent such as a commercial detergent or a surface active dye, may be added to the solution undergoing foaming. In the example presently described, approximately 0.04 wt. percent of patent blue dye was added to enhance foam stability.

A portion of the froth is withdrawn overhead through line 16 and passed to unit 17 wherein the foam is collapsed. Defoaming may be accomplished merely by providing a long residence time for the foam to break up, or by numerous other means such as mechanical action, increased temperatures, electrical means, etc. Foam producing gas is vented through line 18. The coalesced foam fraction containing a high concentration of organic impurities is withdrawn through outlet 19, and may be directly recovered by means of conduit 20. This organic rich, caustic fraction may be discarded. However, since it is rich in acid oil, it can be marketed for use as a source of naphthenic acid and phenols.

The collapsed foam drawn off through line 20 has an acid oil concentration of 16.6 wt. percent and contains 32 wt. percent of phenol derivatives.

Product solution, i.e. regenerated caustic, is withdrawn from column 10 by line 21, generally from a lower portion thereof. The regenerated caustic has an acid oil concentration of 0.6 wt. percent and phenol derivative concentration of 7.1 wt. percent.

When the concentration of impurities in the foam fraction is compared to that of the liquid withdrawn through line 21, it is noted that the acid oils are 27.6 times more concentrated in the foam, and that phenols are present 4.5 fold more in the foam than in the regenerated caustic. Further, the regenerated caustic as compared to the original spent caustic feed contains only 65% as much total organic impurities, i.e. about ⅓ were removed in a single pass through the foam tower without reflux.

The regenerated caustic may then be recycled to a hydrocarbon washing step or otherwise employed in other refinery operations.

Temperatures during foaming may range from about 40 to 150° F., 70 to 80° F. being preferred. With regards to the rate of gas introduction to the tower, a balance must be struck between sufficient formation of bubbles to maintain a froth layer, and sufficient contact time between gas bubbles and bulk liquid to allow surface active components to concentrate at the liquid-gas interface. Normally, gas velocities of 1.0 to 50.0 ft./second are employed.

With reference to FIGURE 2, shown therein is a combination system particularly effective in efficiently regenerating spent caustic by the use of foam fractionation, and characterized by the fact foam is used as a clean-up step after previous partial caustic regeneration.

Basically, a hydrocarbon oil stream such as a heating oil is to be subjected to a caustic wash in washer 50, the oil and a 5–25% solution of sodium hydroxide being introduced into vessel 50 in ratio of 10 to 1 by lines 55 and 56, respectively. Contaminants such as phenols, naphthols and naphthenic acids are dissolved in the caustic. The thus sweetened oil is withdrawn through line 57 while spent caustic solution containing about 10–30% organic contaminants is withdrawn overhead through line 58.

The impurities-containing solution is then passed to carbonization unit 51, wherein it is contacted with carbon dioxide introduced through inlet 59 so as to convert the liquid to a sodium carbonate solution. Gases are vented through line 10. Unit 51 operates at about 100 to 150° F. and a pressure generally below 10 p.s.i.g. The organic impurities are considerably less soluble in the carbonate solution than in the sodium hydroxide, and the liquid mixture is passed to settler 52 by conduit 61 in order to allow contaminants to drop out of solution. Impurities are discharged by line 62.

The carbonated solution as decanted in unit 52 is considerably depleted in organic contaminants. It now contains only about 0.2%[1] acid oils and approximately 0.2% phenolic impurities.

In accordance with the present invention, these trace quantities of impurities, heretofore not readily removed by the prior art systems, are separated by foaming the sodium carbonate solution. As previously noted, foam separation is enhanced by the fact that the impurities are in low concentration since the variation of surface tension with concentration in this range is most favorable for concentrating surface active components (the organic impurities) in the foam layer. Thus the present invention is particularly suited to regeneration of caustic containing less than 1 wt. percent organic impurities.

As illustrated in FIGURE 2, the carbonate solution is then sent to foaming tower 53 which operates in much the same manner as previously described relative to FIGURE 1. Gas, such as flue gas, is introduced into the tower as finely dispersed stream by means of line 64 and distributor 65, an impurity rich froth layer being formed in the upper portion of the tower. Foam is taken overhead by line 66 to coalescing zone 67 wherein the foam is collapsed. Flue gas is vented through line 68. Contaminants are withdrawn through outlet 69 and the stripped carbonate solution is withdrawn through line 71.

The coalesced foam removed through line 69 contains 2.0 wt. percent acid oils and 2.0 wt. percent phenols, while the purified sodium carbonate solution now contains less than about 0.06 wt. percent total phenols and acid oils. Generally, at least 35 wt. percent of the soluble acid oils and phenols are thus removed by foaming.

The final step of caustic regeneration is carried out in hydrolyzer 54 wherein the carbonate solution is converted back to hydroxide by steaming at high temperature and pressure, e.g. 400 to 510° F. and 250 to 1400 p.s.i.g. Steam is introduced by line 72 at a rate of about one pound of water (converted into steam) per 3 pounds of carbonate solution. Off gases are removed through vent 73. If the residual organics had not been foamed from the carbonate solution prior to hydrolysis, they would have seriously interfered with the hydrolysis step by forming undesirable amounts of stable foam in tower 54.

The hydrolyzed solution is now essentially fully regenerated sodium hydroxide. Normally, it is desirable to add some fresh alkali by line 75 to the regenerated caustic as it is recycled to washer 50 by lines 70 and 74. Since part of the sodium hydroxide will be consumed for each contact with the sour oil, concentrated sodium hydroxide is added as a make-up solution.

Thus, it is seen that by combining carbonization-regeneration and foam fractionation, spent caustic may be almost totally freed of impurities. Both procedures complement each other since the former is particularly suited to rough separation and the latter to fractionation of dilute concentrations of impurities.

Another manner of advantageously employing the

---

[1] Acid oils are measured as equivalent of cyclohexanoic acid measured by potentiometric methods.

present invention will now be described. This method is also designed to secure additional advantages from the phenomenon that caustic solutions containing dilute concentrations of organic impurities are more readily foam fractionated than those having a high concentration of surface active materials. In accordance with this method, a very dilute caustic solution, e.g. 0.1–5% NaOH is used to remove organic impurities from a hydrocarbon fraction. The oil and dilute caustic are contacted only once, so as to allow some surface active impurities to pass into the caustic but not to use up all the alkali metal ions available in the caustic solution. The limited contacting specified will result in the transference of only small quantities of surface-active materials (organic impurities) to the caustic phase. Contact time is controlled to result in a caustic solution containing less than 1.0 wt. percent total organics, and less than 0.5 wt. percent acid oils. The exceptionally good fractionation obtained by foaming this partially spent caustic is tabulated below. The following conditions were employed: nitrogen gas, 80° F., and gas velocities of 4 to 40 ft./sec.

Table 1

| | Feed Solution | Foam Fraction | Bottom Liquid Fraction | Conc. Foam/Conc. Liquid |
|---|---|---|---|---|
| Run 1—Wt. Percent Acid Oils | 0.16 | 0.4 | Approx. 0 | Very high |
| Run 2—Wt. Percent Acid Oils | 0.11 | 1.81 | 0.06 | 30 |
| Run 3—Wt. Percent Acid Oils | 0.25 | 0.98 | 0.09 | 10 |

A typical procedure for employing the above mode of separation might also utilize an oxidation step for treating the bottom liquid of the foaming step in order to further remove mercaptans and sulfides from the regenerated caustic solution. A study of Table I indicates that highly effective regeneration of spent caustic is thus secured.

Table 2 presents a compilation of data applicable to the systems heretofore described.

Table 2

| | Broad Range | Preferred Range |
|---|---|---|
| Caustic Solution Concentration Used for Hydrocarbon Wash, Wt. Percent | 0.1–25 | 0.1–5.0 |
| Concentration of Acid Oils plus Phenol Derivatives in Spent Caustic Solution to be foamed, Wt. Percent | 0.1–15 | 0.1–0.6 |
| Concentration of Acid Oils in Spent Caustic Solution to be foamed, Wt. Percent | 0.1–3.0 | 0.1–0.3 |

Numerous modifications may be made with regards to the present invention without departing from the spirit thereof. Though the use of a dispersed gas is preferred, foaming may be effected by mechanical agitation, oppositely directed jets of caustic solution, etc.

Application of the present invention for the regeneration of spent caustic solution results in a fairly cheap and highly effective manner of removing substantially all surface-active contaminants from the caustic solution. The present foam fractionation procedure is particularly well suited to use as a clean up step in conjunction with conventional regenerative processes since it is extremely effective in dealing with low concentrations of impurities.

What is claimed is:

1. In a process wherein an alkaline solution is employed to wash a hydrocarbon oil so as to remove undesired organic constituents, and wherein the alkaline solution becomes spent due to its contact with said hydrocarbon oil and the consequent presence of organics in the alkaline solution, the improved method of at least partially regenerating said alkaline solution which comprises foaming said spent alkaline solution so as to form distinct froth and liquid portions and to concentrate organics in said froth, and separating said froth from said liquid so as to secure an alkaline liquid having a reduced concentration of organic impurities therein.

2. The improvement of claim 1 wherein said alkaline solution is a solution of sodium hydroxide.

3. The improvement of claim 2 wherein prior to foaming, said spent solution of sodium hydroxide is partially regenerated by contact with carbon dioxide thus forming a sodium carbonate solution, only a small portion of the organic impurities being soluble therein, and wherein said soluble organic impurities are removed by subjecting said sodium carbonate solution to foaming.

4. The improvement of claim 1 wherein said alkaline solution is subjected to foaming by passing finely dispersed gas therethrough.

5. A method for regenerating a spent caustic solution which has been employed to wash a hydrocarbon oil so as to remove organic impurities therefrom, at least a portion of said organic impurities thus passing into said caustic solution and depleting its effectiveness, which comprises subjecting said spent caustic solution to foaming by passing a gas stream therethrough so as to form a foam layer above said solution, organic impurities thus being concentrated in said foam, separating at least a portion of said foam from said liquid, and recovering liquid having a reduced concentration of organic impurities.

6. The method of claim 5 wherein a 0.1 to 5.0 wt. percent caustic solution is used as the hydrocarbon oil wash.

7. The method of claim 5 wherein said organic impurities comprise residual acid oils and derivatives of phenol.

8. The method of claim 5 wherein said gas stream comprises a gas which reacts with a portion of said organic impurities, converted organic contaminants being concentrated in said foam layer along with unconverted organic impurities.

9. The method of claim 7 wherein the concentration of organic impurities in the spent caustic to be foamed is less than 1.0 wt. percent.

10. An improved process for removing organic contaminants from a hydrocarbon oil which comprises, contacting said oil with an aqueous caustic solution for a time sufficient to cause organic contaminants to pass into said caustic solution, separating spent caustic solution from said oil, passing carbon dioxide through said spent caustic solution so as to change it to a carbonate solution, a substantial portion of said contaminants thus being removed due to their insolubility in said carbonate solution while however leaving a small concentration of organic impurities in said solution, subjecting said carbonate solution to foaming by passing a finely dispersed gas therethrough, said remaining organic impurities being concentrated in the froth thus formed, separating contaminant-containing froth from the remainder of said carbonate solution, subjecting at least a portion of the thus purified carbonate solution to contact with steam at elevated temperatures so as to form a regenerated caustic solution, and further utilizing said regenerated caustic solution for contact with said hydrocarbon oil.

11. The improvement of claim 10 wherein said organic contaminants comprise acid oil and derivatives of phenol, said carbonate solution contains less than 1.0% of said contaminants in solution, and wherein at least 35% of said soluble contaminants are removed by foaming.

12. The improvement of claim 1 wherein said organic impurities comprise residual acid oils and derivatives of phenol.

References Cited in the file of this patent

UNITED STATES PATENTS

| | | |
|---|---|---|
| 2,273,104 | Hellman | Feb. 17, 1942 |
| 2,336,109 | Lowry et al. | Dec. 7, 1943 |
| 2,719,109 | Harper et al. | Sept. 27, 1955 |
| 2,897,144 | Bieber et al. | July 28, 1959 |